(12) United States Patent
Lin

(10) Patent No.: US 9,008,475 B2
(45) Date of Patent: Apr. 14, 2015

(54) PHOTOELECTRIC COUPLING MODULE

(71) Applicant: Hon Hai Precision Industry Co., Ltd., New Taipei (TW)

(72) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/968,388

(22) Filed: Aug. 15, 2013

(65) Prior Publication Data

US 2014/0199021 A1 Jul. 17, 2014

(30) Foreign Application Priority Data

Jan. 14, 2013 (TW) .............................. 102101291 A

(51) Int. Cl.
*G02B 6/32* (2006.01)

(52) U.S. Cl.
CPC ...................................... *G02B 6/322* (2013.01)

(58) Field of Classification Search
CPC ......................................................... G02B 6/322
USPC ............................................... 385/33, 53–79
See application file for complete search history.

(56) References Cited

U.S. PATENT DOCUMENTS

| 5,241,612 | A * | 8/1993 | Iwama ............................. 385/74 |
| 6,220,762 | B1 * | 4/2001 | Kanai et al. ..................... 385/53 |
| 6,702,479 | B2 * | 3/2004 | Yang ................................ 385/78 |
| 7,025,511 | B2 * | 4/2006 | Nakajima ........................ 385/93 |
| 8,840,322 | B2 * | 9/2014 | Lin et al. .......................... 385/90 |
| 2004/0047582 | A1 * | 3/2004 | Nasiri et al. .................. 385/137 |
| 2005/0225864 | A1 * | 10/2005 | Kornrumpf et al. .......... 359/619 |
| 2009/0046981 | A1 * | 2/2009 | Margolin et al. .............. 385/70 |
| 2009/0154884 | A1 * | 6/2009 | Chen et al. ...................... 385/79 |
| 2014/0064667 | A1 * | 3/2014 | Isenhour et al. ................ 385/76 |
| 2014/0147078 | A1 * | 5/2014 | Bhagavatula et al. .......... 385/33 |
| 2014/0153881 | A1 * | 6/2014 | Liff et al. ........................ 385/89 |

* cited by examiner

*Primary Examiner* — Ellen Kim
(74) *Attorney, Agent, or Firm* — Novak Druce Connolly Bove + Quigg LLP

(57) ABSTRACT

A photoelectric coupling module includes a fiber module, a lens module, and at least one positioning pole. The fiber module defines a plurality of receiving holes and at least one first positioning hole. The lens module includes a central portion and an edge portion surrounding the central portion. The central portion includes a plurality of lenses, and the lenses are respectively aligned with the receiving holes. The edge portion defines at least one second positioning hole. The at least one positioning pole is made of metal, and penetrates the at least one second positioning hole and the at least one first positioning hole.

14 Claims, 3 Drawing Sheets

PHOTOELECTRIC COUPLING MODULE

BACKGROUND

1. Technical Field

The present disclosure relates to photoelectric technologies and, particularly, to a photoelectric coupling module.

2. Description of Related Art

Photoelectric coupling modules generally include a fiber module and a lens module coupled to the fiber module. The fiber module defines at least one positioning hole, and the lens module includes at least one positioning pole. The positioning pole is received in the positioning hole to ensure a coupling accuracy of the fiber module and the lens module. However, as the positioning pole is integrally molded with the lens module using plastic material, the positioning pole is readily deformed and abraded, which results in that the coupling accuracy of the fiber module and the lens module is decreased.

Therefore, it is desirable to provide a photoelectric coupling module, which can overcome the limitations described.

DETAILED DESCRIPTION

Embodiments of the disclosure will be described with reference to the drawings.

Figure 1:
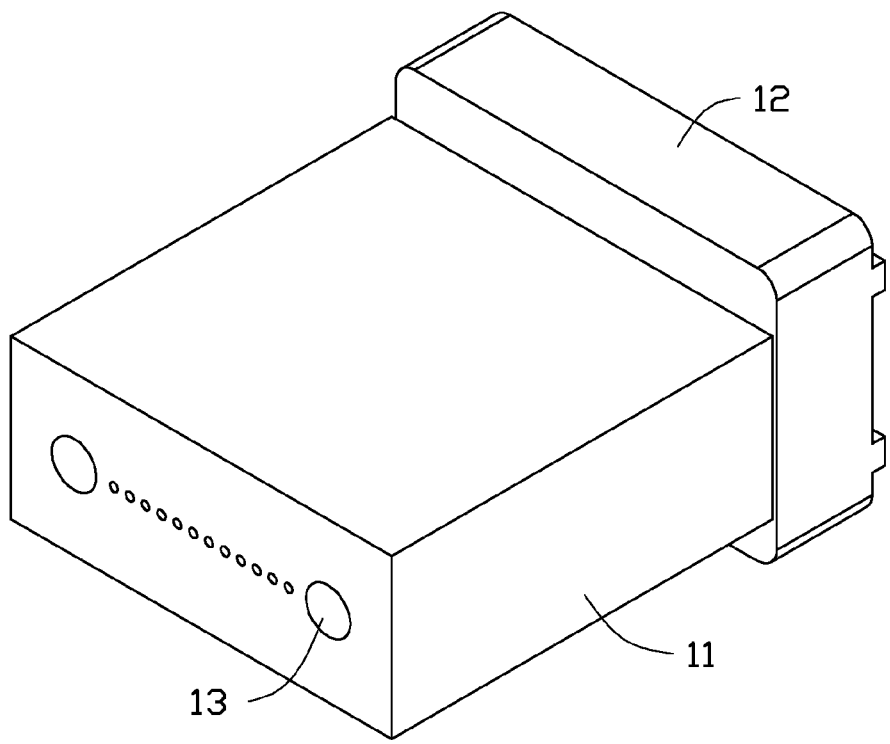
FIG. 1 is a schematic view of a photoelectric coupling module in accordance with an exemplary embodiment.
Figure 2:
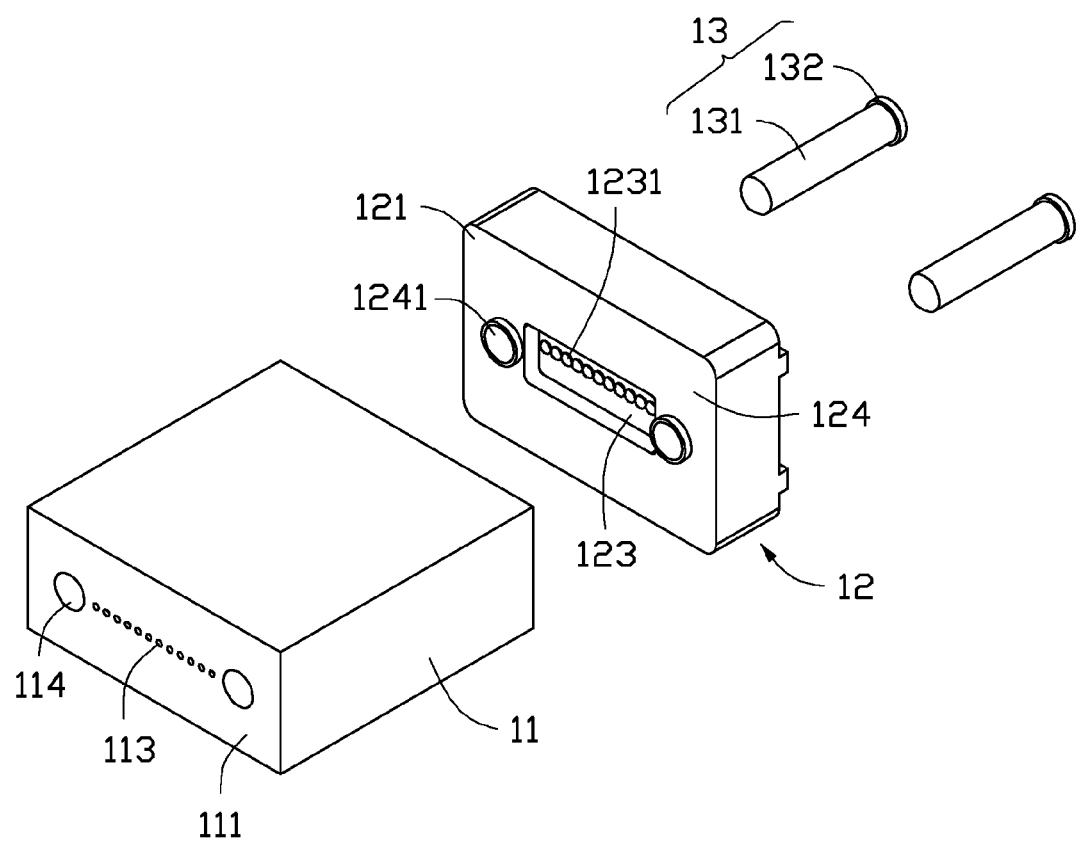
FIG. 2 is an isometric, exploded, and schematic view of the photoelectric coupling module of FIG. 1.
Figure 3:
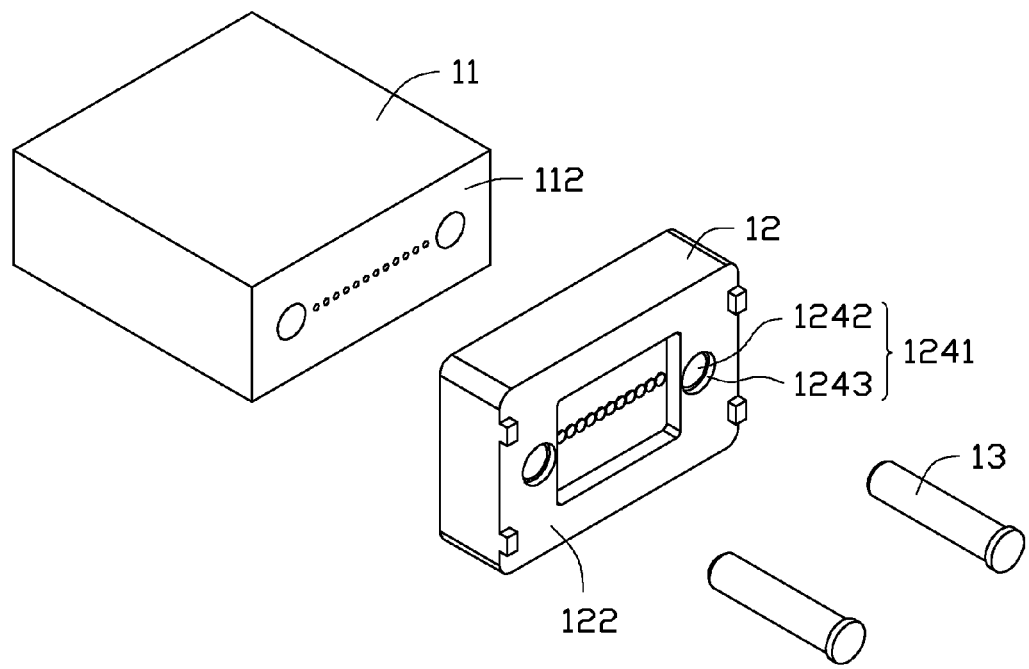
FIG. 3 is similar to FIG. 2, but viewed from another angle.

FIGS. 1-3 show a photoelectric coupling module 10, according to an exemplary embodiment. The photoelectric coupling module 10 includes a fiber module 11, a lens module 12, and at least one positioning pole 13. In the embodiment, the number of the positioning poles 13 is two.

The fiber module 11 is a cuboid, and is integrally molded using plastic. The fiber module 11 includes a front surface 111 and a rear surface 112 opposite to the front surface 111. The fiber module 11 defines a number of receiving holes 113 running through the front surface 111 and the rear surface 112. The fiber module 11 also defines at least one first positioning hole 114 in the rear surface 112.

The receiving holes 113 are substantially parallel with each other and perpendicular to the front surface 111 and the rear surface 112. The receiving holes 113 are linearly and are equidistantly arranged. The receiving holes 113 are used for receiving optical fibers (not shown). The first positioning hole 114 is parallel to the receiving holes 113. In the embodiment, the number of first positioning holes 114 is two and the first positioning holes 114 are positioned adjacent to two opposite sides. The receiving holes 113 are positioned between the two first positioning holes 114.

The first positioning holes 114 can be through holes or blind holes. An internal diameter of the first positioning holes 114 is greater than an internal diameter of the receiving hole 113.

The lens module 12 is a cuboid and is made of plastic material. The lens module 12 is integrally molded. The lens module 12 includes a left surface 121 and a right surface 122 opposite to the left surface 121. The lens module 12 includes a central portion 123 and an edge portion 124 surrounding the central portion 123. A thickness of the central portion 123 is less than a thickness of the edge portion 124. The central portion 123 includes a number of lenses 1231. The lenses 1231 are substantially linearly arranged. The number of the lenses 1231 is corresponding to the number of the receiving holes 113.

The edge portion 124 defines at least one second positioning hole 1241 running through the left surface 121 and the right surface 122. The second positioning hole 1241 is a stepped hole, and includes a first portion 1242 running through the left surface 121 and a second portion 1243 running through the right surface 122. An internal diameter of the first portion 1242 is less than an internal diameter of the second portion 1243, and is substantially equal to the internal diameter of the first positioning holes 114. In the embodiment, the edge portion 124 defines two second positioning hole 1241 adjacent to two opposite sides thereof. The lenses 1231 are positioned between the two second positioning hole 1241.

The positioning pole 13 is substantially cylindrical and is made of metal, such as iron and copper. The positioning pole 13 includes a connecting portion 131 and a stopping portion 132 connected to an end of the connecting portion 131. An external diameter of the stopping portion 132 is greater than an external diameter of the connecting portion 131. The external diameter of the connecting portion 131 is substantially equal to the internal diameter of the first portion 1242 of the second positioning hole 1241 or the first positioning hole 114. A length of the connecting portion 131 is greater than twice of the thickness of the edge portion 124.

In assembly, the lens module 12 is attached on the fiber module 11 by the positioning poles 13. The rear surface 112 of the lens module 12 contacts with the left surface 121 of the lens module 12. The lenses 1231 are respectively aligned with the receiving holes 113. The connecting portion 131 of the positioning pole 13 penetrates the second positioning hole 1241 and the first positioning hole 114. The stopping portion 132 is received in the second portion 1243 of the second positioning hole 1241.

In use, light rays projected on the lenses 1231 are converged by the lenses 1231, and then emit into the optical fibers received in the receiving holes 113. The light rays emitted from the optical fibers are received in the receiving hole 113. The light rays are projected to the lenses 1231, the lenses 1231 converges the light rays to an photo diode (not shown).

In the embodiment, since the mechanical strength and the abrasive resistance of the positioning poles 13 made of metal are better than the other positioning poles made of plastic material, a coupling accuracy of the fiber module 11 and the lens module 12 is increased.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A photoelectric coupling module, comprising:
    a fiber module defining a plurality of receiving holes and at least one first positioning hole;
    a lens module comprising a central portion and an edge portion surrounding the central portion, a thickness of the central portion is less than a thickness of the edge portion;
    the central portion comprising a plurality of lenses, the lenses respectively aligned with the receiving holes;
    the edge portion defining at least one second positioning hole; and at least one positioning pole made of metal, and penetrating the at least one second positioning hole and the at least one first positioning hole.

2. The photoelectric coupling module of claim 1, wherein the fiber module comprises a front surface and a rear surface opposite to the front surface, wherein the receiving holes run through the front surface and the rear surface, and wherein the at least one first positioning hole is defined in the rear surface.

3. The photoelectric coupling module of claim 2, wherein the receiving holes are substantially parallel with each other and perpendicular to the front surface and the rear surface; and wherein the receiving holes are linearly and equidistantly arranged.

4. The photoelectric coupling module of claim 3, wherein the at least one first positioning hole is parallel to the receiving holes, wherein the number of the at least one first positioning hole is two and the two first positioning holes are positioned adjacent to two opposite sides thereof, and wherein the receiving holes are positioned between the two first positioning holes.

5. The photoelectric coupling module of claim 1, wherein the lens module comprises a left surface and a right surface opposite to the left surface, the at least one second positioning hole running through the right surface and the left surface.

6. The photoelectric coupling module of claim 5, wherein each second positioning hole is a stepped hole, and comprises a first portion running through the left surface and a second portion running through the right surface; and wherein an internal diameter of the first portion is less than an internal diameter of the second portion.

7. The photoelectric coupling module of claim 6, wherein the internal diameter of the first portion of each second positioning hole is substantially equal to the internal diameter of each first positioning hole.

8. The photoelectric coupling module of claim 6, wherein each positioning pole comprises a connecting portion and a stopping portion connected to an end of the connecting portion, and wherein an external diameter of the stopping portion is greater than an external diameter of the connecting portion.

9. The photoelectric coupling module of claim 8, wherein the connecting portion is received in the first positioning hole and the first portion of the second positioning hole, and the stopping portion is received in the second portion of the second positioning hole.

10. A photoelectric coupling module, comprising:
a fiber module defining a plurality of receiving holes and at least one first positioning hole;
a lens module comprising a central portion and an edge portion surrounding the central portion; the central portion comprising a plurality of lenses, the lenses respectively aligned with the receiving holes; the edge portion defining at least one second positioning hole, the lens module further comprising a left surface and a right surface opposite to the left surface, the at least one second positioning hole is a stepped hole and comprises a first portion running through the left surface and a second portion running through the right surface, a stepped portion being formed for connecting the first portion and the second portion, an internal diameter of the first portion is less than an internal diameter of the second portion; and
at least one positioning pole made of metal, each positioning pole comprises a connecting portion and a stopping portion connected to an end of the connecting portion, an external diameter of the stopping portion is greater than an external diameter of the connecting portion, and each connecting portion is received in the at least one second positioning hole and the at least one first positioning hole, the stopping portion is received in the second portion of the at least one second positioning hole.

11. The photoelectric coupling module of claim 10, wherein the fiber module comprises a front surface and a rear surface opposite to the front surface, the receiving holes run through the front surface and the rear surface, and wherein the at least one first positioning hole is defined in the rear surface.

12. The photoelectric coupling module of claim 11, wherein the receiving holes are substantially parallel with each other and perpendicular to the front surface and the rear surface; and wherein the receiving holes are linearly and equidistantly arranged.

13. The photoelectric coupling module of claim 12, wherein the at least one first positioning hole is parallel to the receiving holes, wherein the number of the at least one first positioning hole is two and the two first positioning holes are positioned adjacent to two opposite sides thereof, and wherein the receiving holes are positioned between the two first positioning holes.

14. The photoelectric coupling module of claim 10, wherein the internal diameter of the first portion of each second positioning hole is substantially equal to the internal diameter of each first positioning hole.

* * * * *